(12) United States Patent
Mauchly et al.

(10) Patent No.: US 8,861,598 B2
(45) Date of Patent: Oct. 14, 2014

(54) VIDEO COMPRESSION USING SEARCH TECHNIQUES OF LONG-TERM REFERENCE MEMORY

(75) Inventors: William Mauchly, Berwyn, PA (US); Joseph T. Friel, Ardmore, PA (US); Alan MacDonald, Malvern, PA (US); Dihong Tian, San Jose, CA (US); Wen-Hsiung Chen, Sunnyvale, CA (US); Michael A. Arnao, Collegeville, PA (US)

(73) Assignee: Cisco Technology, Inc., San Jose, CA (US)

( * ) Notice: Subject to any disclaimer, the term of this patent is extended or adjusted under 35 U.S.C. 154(b) by 1338 days.

(21) Appl. No.: 12/051,185

(22) Filed: Mar. 19, 2008

(65) Prior Publication Data

US 2009/0238278 A1    Sep. 24, 2009

(51) Int. Cl.
| H04N 7/12 | (2006.01) |
| H04N 19/176 | (2014.01) |
| H04N 19/189 | (2014.01) |
| H04N 19/61 | (2014.01) |
| H04N 19/58 | (2014.01) |
| G06T 7/20 | (2006.01) |
| H04N 19/17 | (2014.01) |
| G06F 17/30 | (2006.01) |

(52) U.S. Cl.
CPC ...... *H04N 7/367* (2013.01); *G06T 2207/30196* (2013.01); *H04N 7/26244* (2013.01); *H04N 7/26313* (2013.01); *H04N 7/50* (2013.01); *G06T 7/2033* (2013.01); *G06T 2207/10016* (2013.01); *H04N 7/26276* (2013.01); *G06F 17/30781* (2013.01)
USPC .................................................. 375/240.12

(58) Field of Classification Search
None
See application file for complete search history.

(56) References Cited

U.S. PATENT DOCUMENTS

| 6,611,560 | B1 * | 8/2003 | Kresch et al. ............ 375/240.16 |
| 6,633,655 | B1 * | 10/2003 | Hong et al. .................... 382/118 |
| 6,714,665 | B1 * | 3/2004 | Hanna et al. .................... 382/117 |
| 6,795,127 | B1 * | 9/2004 | Hori et al. ...................... 375/240 |
| 7,324,693 | B2 * | 1/2008 | Chen ............................. 382/199 |
| 7,801,223 | B2 * | 9/2010 | Winger .................... 375/240.25 |

(Continued)

FOREIGN PATENT DOCUMENTS

| WO | WO2008/124409 | 10/2008 |
| WO | WO2009/117308 | 9/2009 |

OTHER PUBLICATIONS

PCT International Search Report mailed Aug. 9, 2009 for PCT/US09/36966; 3 pages.

(Continued)

*Primary Examiner* — Gregory Sefcheck
*Assistant Examiner* — Joshua Smith
(74) *Attorney, Agent, or Firm* — Patent Capital Group

(57) ABSTRACT

Particular embodiments generally relate to video compression. In one embodiment, a store of reference frames is provided in memory. The reference frames may be classified based on a plurality of classifiers. The classifiers may correspond to features that are found in the reference frame. A frame to encode is then received. The frame is analyzed to determine features found in the frame. As macroblocks in the frame are encoded, a macroblock is analyzed to determine which feature may be included in the macroblock. The feature is used to determine a classifier, which is used to determine a subset of the reference frames. The subset is then searched to determine a reference frame for the macroblock.

20 Claims, 4 Drawing Sheets

(56) References Cited

U.S. PATENT DOCUMENTS

| | | | | |
|---|---|---|---|---|
| 7,853,050 | B2* | 12/2010 | Wang et al. | 382/118 |
| 2002/0131498 | A1* | 9/2002 | Sun et al. | 375/240.12 |
| 2003/0169907 | A1* | 9/2003 | Edwards et al. | 382/118 |
| 2004/0213460 | A1* | 10/2004 | Chen | 382/199 |
| 2005/0053144 | A1* | 3/2005 | Holcomb | 375/240.16 |
| 2005/0084179 | A1* | 4/2005 | Hanna et al. | 382/294 |
| 2005/0094727 | A1* | 5/2005 | Ha et al. | 375/240.12 |
| 2005/0123056 | A1* | 6/2005 | Wang et al. | 375/240.25 |
| 2005/0243921 | A1* | 11/2005 | Au et al. | 375/240.12 |
| 2005/0254584 | A1 | 11/2005 | Kim et al. | |
| 2006/0018383 | A1* | 1/2006 | Shi et al. | 375/240.16 |
| 2006/0098738 | A1 | 5/2006 | Cosman et al. | |
| 2006/0159174 | A1* | 7/2006 | Chono | 375/240.12 |
| 2006/0188020 | A1* | 8/2006 | Wang | 375/240.16 |
| 2006/0215759 | A1* | 9/2006 | Mori | 375/240.12 |
| 2006/0233249 | A1* | 10/2006 | Park et al. | 375/240.12 |
| 2007/0008323 | A1 | 1/2007 | Zhou | |
| 2007/0058715 | A1* | 3/2007 | Kim et al. | 375/240.03 |
| 2007/0098068 | A1* | 5/2007 | Kimata et al. | 375/240.12 |
| 2007/0177666 | A1 | 8/2007 | Suman et al. | |
| 2008/0025407 | A1* | 1/2008 | Winger | 375/240.25 |
| 2008/0095232 | A1* | 4/2008 | Boice et al. | 375/240.12 |
| 2008/0130755 | A1* | 6/2008 | Loukas et al. | 375/240.24 |
| 2008/0151991 | A1* | 6/2008 | Trimeche et al. | 375/240.01 |
| 2008/0247463 | A1* | 10/2008 | Buttimer et al. | 375/240.12 |
| 2009/0110078 | A1* | 4/2009 | Crinon | 375/240.24 |
| 2009/0268079 | A1* | 10/2009 | Motomura et al. | 375/240.01 |
| 2010/0150240 | A1* | 6/2010 | Wahadaniah et al. | 375/240.15 |
| 2010/0239119 | A1* | 9/2010 | Bazakos et al. | 382/103 |
| 2010/0246680 | A1 | 9/2010 | Tian et al. | |

OTHER PUBLICATIONS

PCT International Preliminary Report on Patentability mailed Sep. 21, 2010 for PCT/US09/36966; 8 pages.

Wiegand, Thomas, et al. "Long-Term Memory Motion-Compensated Prediction" IEEE Transactions on Circuits and Systems for Video Technology, vol. 9, No. 1, Feb. 1999, 13 pages.

Wiegand, Thomas, et al. "Error-Resilient Video Transmission Using Long-Term Memory Motion-Compensated Prediction" IEEE Journal on Selected Areas in Communications, vol. 18, No. 6, Jun. 2000, 13 pages.

Hidalgo, Javier Ruiz "On the Synergy Between Indexing and Compression Representations for Video Sequences" Department of Signal Theory and Communications, PhD. Dissertation, Unversitat Politecnica De Catalunya, Barcelona, Sep. 2006, 253 pages.

Eisert, Peter, et al. "Model-Aided Coding: A New Approach to Incorporate Facial Animation into Motion-Compensated Video Coding" IEEE Transactions on Circuits and Systems for Video Technology, vol. 10, No. 3, Apr. 2000, 15 pages.

Wen, Zhen, et al., "Low Bit-Rate Video Streaming for Face-to-Face Teleconference" IEEE International Conference on Multimedia and Expo, Jul. 2004, 4 pages.

Hsiao, Yi-Hon, et al. "Short/Long-Term Motion Vector Prediction in Multi-Frame Video Coding System" ICIP, Nov. 2004, 4 pages.

Sun, Qi-Chao, et al. "An Efficient Multi-Frame Dynamic Search Range Motion Estimation for H.264" Proceedings of SPIE, vol. 6508 Visual Communications and Image Processing, 2007.

Li, Xiang, et al. "Fast Multi-Frame Motion Estimation Algorithm with Adaptive Search Strategies in H.264" IEEE International Conference, vol. 13, Issue 17-21, May 2004, 4 pages.

Ting, Chi-Wang, et al. "Fast Block-Matching Motion Estimation by Recent-Biased Search for Multiple Reference Frames" ICIP 2004 International Conference, vol. 3, Issue 24-27, Oct. 2004, 4 pages.

Chung, Hyukjune, et al. "Low Complexity Motion Estimation Algorithm by Multiresolution Search for Long-Term Memory Motion Compensation" IEEE International Conference, Sep. 2002, 4 pages.

Chung, Hyukjune, et al. "Fast Long-Term Motion Estimation for H.264 Using Multiresolution Search" ICIP 2003, 4 pages.

Fraunhofer Institut, Image Communication "Multi-frame Motion-Compensated Prediction" obtained at http://ip.hhi.de/imagecom_G1/mfp.htm, 7 pages.

U.S. Appl. No. 11/736,717, filed Apr. 18, 2007, Maurice Buttimer, et al.

Hidalgo, Javier Ruiz, et al., "On the Use of Indexing Metadata to Improve the Efficiency of Video Compression", IEEE vol. 16, No. 3, Mar. 2006; 10 pages.

Smith, Mark, et al., "An Object-Based Approach for Digital Video Retrieval", IEEE (ITCC '04) 0-7695-2108-8/04; 4 pages.

Tamhankar, A., et al., "An Overview of H.264/MPEG-4 Part 10" University of Texas at Arlington; 51 pages.

International Telecommunication Union ITU-T "Series H: Audiovisual and Multimedia Systems—Video Coding for Low Bit Rate Communication" Annex U (Nov. 2000); 30 pages.

Sun, Shijun, et al.; "Reference Frame Prediction for Fast Motion Estimation"; ITU—Study Group 16, 13th meeting, Austin, USA; Apr. 2-4, 2001; 6 pages.

PCT Jun. 9, 2009 International Search Report from International Application PCT/US08/59065; 1 page.

PCT Dec. 7, 2009 International Preliminary Report on Patentability and Written Opinion of the International Searching Authority from International Application PCT/US08/59065; 9 pages.

\* cited by examiner

VIDEO COMPRESSION USING SEARCH TECHNIQUES OF LONG-TERM REFERENCE MEMORY

TECHNICAL FIELD

Particular embodiments generally relate to video compression.

BACKGROUND

Video compression relies on two types of compressed video frames, Instantaneous Decoder Refresh frames (IDR-frames) and temporal predictive coding frames (P-frames). P-frames use inter-frame coding wherein a video frame is coded in terms of motion vectors and block coding referencing an already decoded frame (Reference frame). P-frames have the advantage over IDR-frames because they require less bandwidth.

The use of Long-Term Reference Frames (LTRFs) can increase video coding efficiency. Modern video standards such as H.264 allow as many as 16 reference frames to be retained at the decoder and used to predict future frames.

In some applications, such as video conferencing, periodic IDR-frames may not be necessary because no new decoder endpoints are added to a video conference after it starts. Without periodic IDR frames, there is no need to flush the decoder memory of reference frames. A long term reference memory may be used to store a very large number of reference frames. This may allow for high quality compression at lower bitrates. However, the time to search the memory for the best reference frame may be time-consuming.

DETAILED DESCRIPTION OF EMBODIMENTS

Overview

Particular embodiments generally relate to video compression. In one embodiment, a store of reference frames is provided in memory. The reference frames may be classified based on a plurality of classifiers. The classifiers may correspond to features that are found in the reference frame. A frame to encode is then received. The frame is analyzed to determine features found in the frame. As macroblocks in the frame are encoded, a macroblock is analyzed to determine which feature may be included in the macroblock. The feature is used to determine a classifier, which is used to determine a subset of the reference frames. The subset is then searched to determine a reference frame for the macroblock. For example, a motion search is performed to find a reference frame that includes a rectangular block of pixels that best matches the pixels in the current macroblock. This found reference block is considered the best block for motion prediction. The location of this block in the reference frame, relative to the block in the current frame, is recorded as a motion vector. The macroblock may then be encoded using the reference block of the reference frame. This process may be repeated for all macroblocks of the current frame. The encoder performs less computation than if it had searched through all available reference frames.

The encoded frame is sent to a decoder, which may then decode the frame. Information may be included that identifies the reference frame that was used to decode the macroblocks of the frame. The decoder may use the identifier to retrieve the reference frame from a second memory of reference frames. The reference frame may then be used to decode the macroblock.

Example Embodiments

Figure 1:
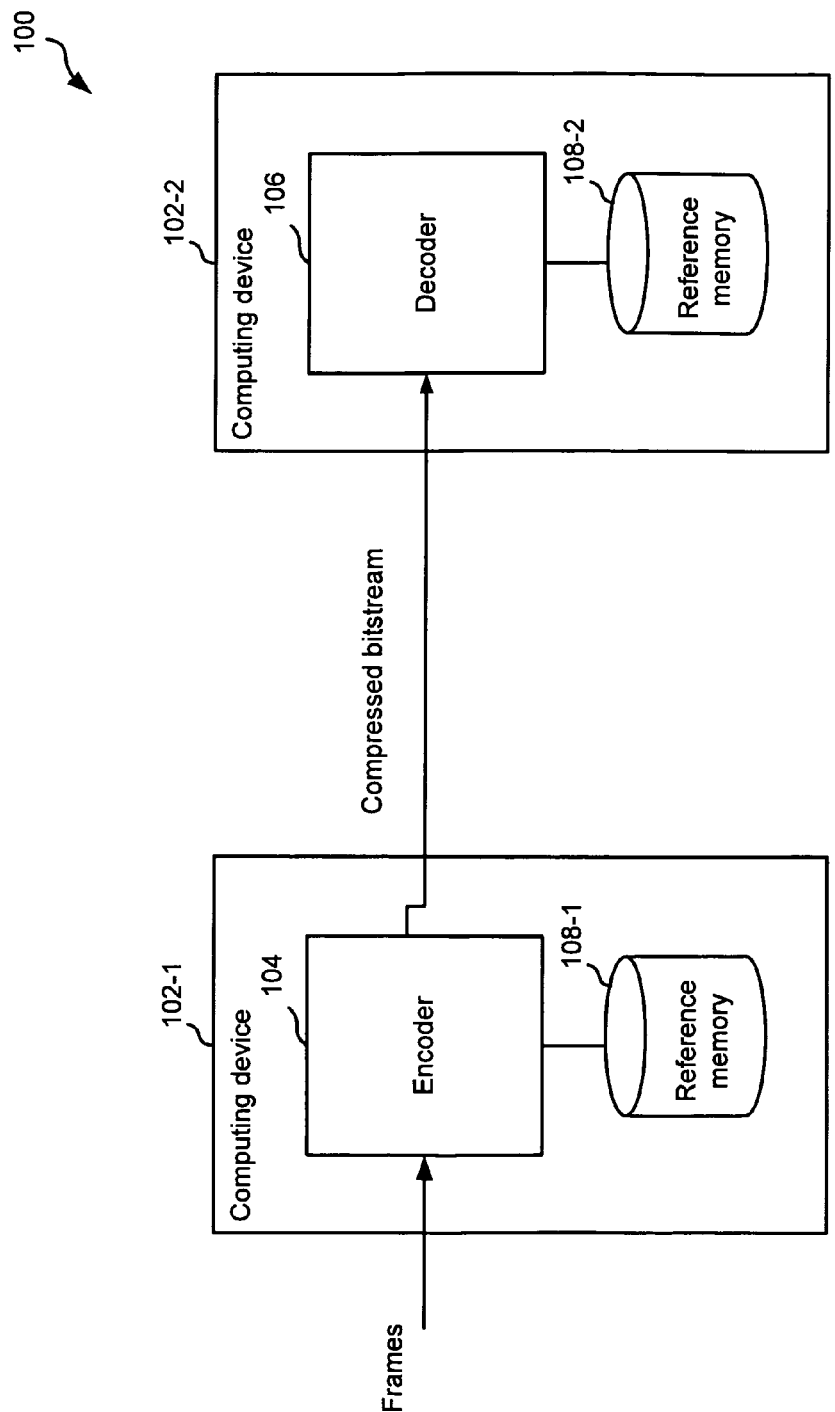
FIG. 1 depicts an example of a system for providing video compression according to one embodiment.

FIG. 1 depicts an example of a system 100 for providing video compression according to one embodiment. As shown, a plurality of computing devices 102 are provided. In one example, computing devices 102 may include video conferencing endpoints. In other embodiments, computing devices 102 may include set top boxes, personal computers, or any other computing devices that include encoders and decoders.

An encoder 104 and decoder 106 are provided to encode and decode frames of video. In one example, encoder 104 and decoder 106 may include features of an advanced video coding (AVC) H.264 encoder or decoder, or other related compression standards, such as scalable video coding (SVC) or multi-view video coding (MVC).

In certain applications, such as in video conferencing, the same scene, same objects and same lighting with the same camera position may exist for a long duration of the video stream. For example, in a video conference, minimal movement of the same people in the conference occurs over a period of time. Although a video conference is described, it will be understood that any video may be used, such as movies, television, etc. The above conditions make it likely that parts of frames that were previously used may substantially match objects in a current frame. This may make a long-term reference memory useful. For example, a large number of frames, such as thousands of frames or tens of minutes of frames from video may be stored in a reference memory 108, and can be searched to find a reference frame.

Encoder 104 may be a hybrid video codec. All tools used in H.264 or other video coding standards may apply with an additional feature or features that enhance the encoder as will be described below. In one example, the coding method may be all P-frames. For example, a group of pictures (GOP) may be one IDR frame followed by thousands of P-frames.

Reference memory 108 may include any type of storage. For example, the storage may include a database that can store a large amount (e.g., gigabytes or larger) of reference frames. Particular embodiments use a number (e.g., thousands) of reference frames that are stored in reference memory 108. The thousands of reference frames may be searched to determine a reference frame that can be used to encode a frame. The particular methods of searching will be described in more detail below.

Particular embodiments use motion prediction. Prediction is a well-known technique in compression in which any information that can be derived from past bits does not have to be encoded in the bitstream. A rectangular group of pixels of any size is called a block. A picture is encoded in blocks called macroblocks, which are usually 16 by 16 luma pixels. By sending the difference between a current macroblock and a reference block in a previous frame, the number of bits that are encoded and sent may be reduced. For discussion purposes, a current macroblock is a macroblock being currently encoded and a reference frame and reference block are a frame and block that are being used as a reference in the encoding process.

In particular embodiments, a large number of reference frames are stored in reference memory 108 and thus need to be searched to determine a reference frame and reference block. To facilitate the search, the reference frames may be classified in reference memory 108 based on a plurality of classifiers. The classifiers may be based on features that may be included in frames. In one example, different features may be parts of objects that may be found in a picture, such as parts of a human body. The frames are classified with which features are included in each frame.

When a frame is to be encoded, macroblocks in the frame are encoded. To perform motion prediction, features of the current frame are used to determine reference frames for current macroblocks. A current macroblock may include a feature and references frames that include the same or similar feature are determined. In one embodiment, if a macroblock includes a hand, other reference frames that include the hand are determined. Thus, a smaller subset of frames from the frames stored in reference memory 108 is determined.

Once a subset is determined, a motion search may be performed with the subset to determine a reference block in a reference frame that may be considered the best reference block for a macroblock being encoded. Generally, a reference block in one of the reference frames may be best suited for encoding the current macroblock if the reference block includes a feature (a part of an object) that is in a similar position as a feature in the current macroblock. By limiting the search of the reference frame memory 108 to a subset, a large number of reference frames may be stored and search time may be limited because only a subset of frames are searched during the motion search instead of all frames stored in memory 108. Accordingly, very good reference frames may be determined in a time efficient manner. The current macroblock is then encoded using the reference macroblock. This process may be repeated for all macroblocks in the current frame.

After encoding all of the macroblocks in the current frame, the encoded frame is sent to decoder 106. Decoder 106 may use a second reference memory 108-2. Encoder 104 may send an identifier for the reference frame that was used. Decoder 106 may then use the identifier to determine the reference block in the reference frame in memory 108-2 that was used to encode the macroblock. The macroblock may then be decoded.

The frame search and feature analysis will now be described in more detail with more involved examples of encoder 104 and decoder 106.

Figure 2:
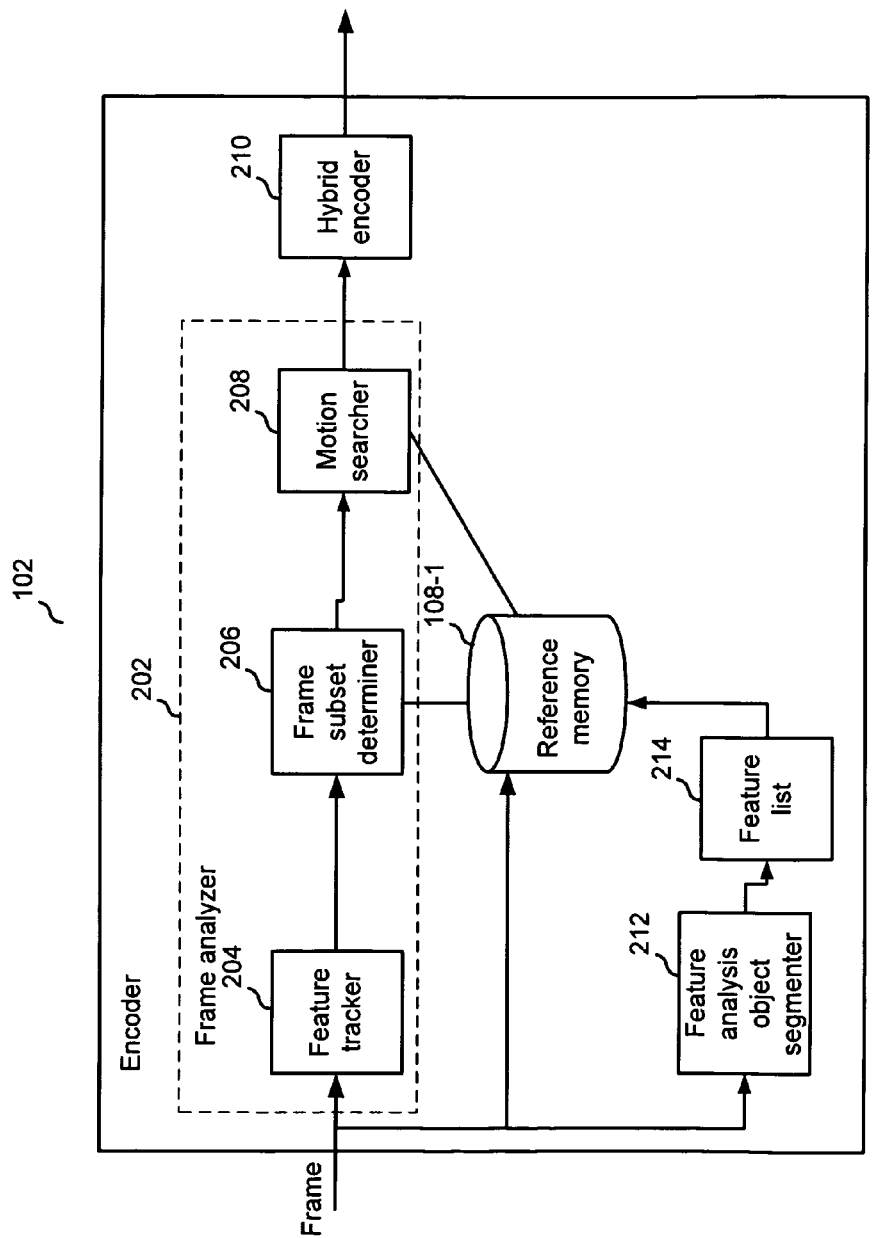
FIG. 2 depicts a more detailed example of an encoder according to one embodiment.

FIG. 2 depicts a more detailed example of encoder 104 according to one embodiment. It should be noted that features of encoder 104 have not been shown for discussion purposes. Frame analyzer 202 is configured to analyze features in a current frame (a frame to be encoded) and select reference frames that will be used to encode the macroblocks of the current frame.

Figure 3:
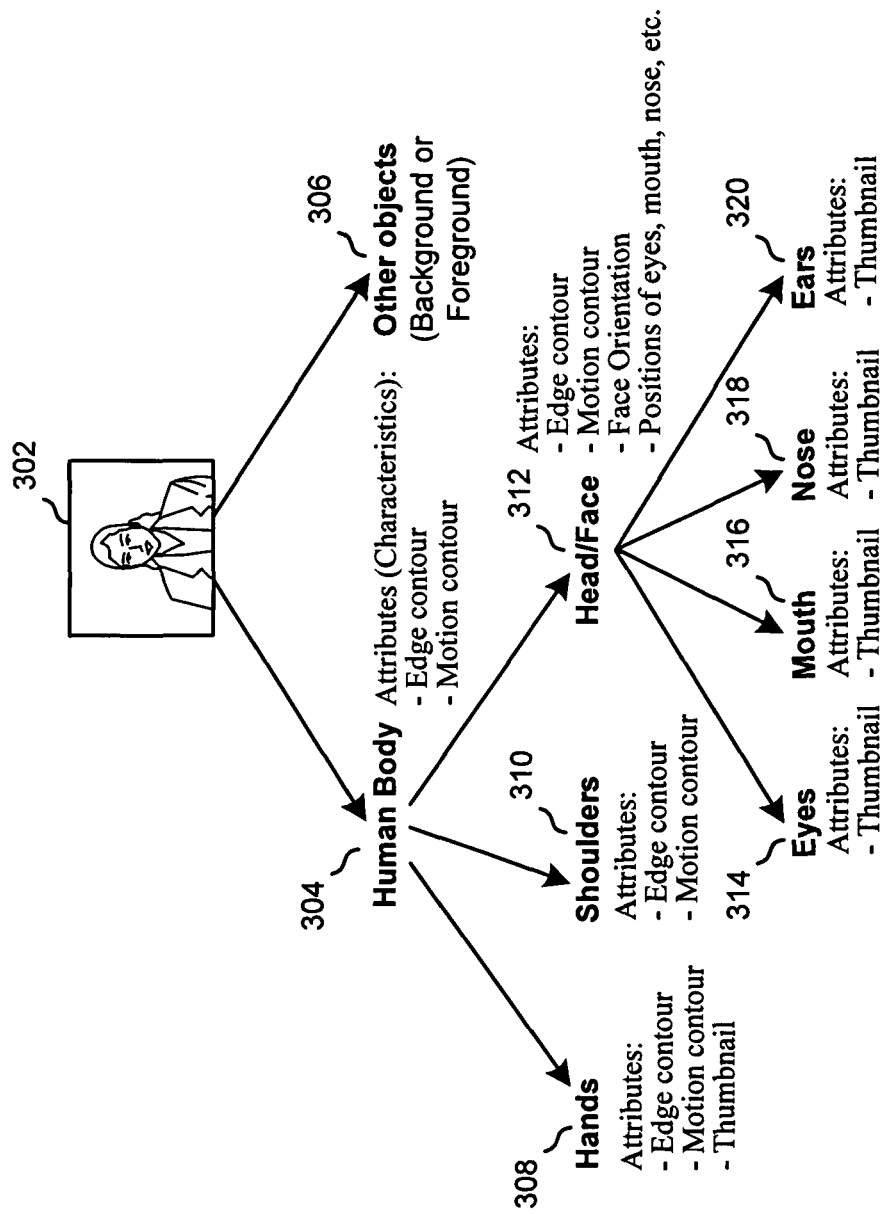
FIG. 3 shows an example of how a frame can be segmented according to one embodiment.

To facilitate searching, reference frames stored in reference memory 108 may be classified using a set of classifiers to allow for subsets of references to be determined during motion prediction. In one embodiment, frames are indexed are based on parametric scene analysis that includes tracking movement of features of the human body. Modeling the object motion in a scene creates a prediction of the most probable reference frames and motion vectors for each macroblock. FIG. 3 shows an example of how a frame can be segmented according to one embodiment. As shown, a frame 302 shows a picture of a woman. A hierarchical structure may be generated for objects detected in frame 302.

A feature tracker 204 may track objects over time. The object may be a human head, hand, arm, torso, etc., or other objects in the picture. An object may be found in a frame and then that area of the frame may be associated with the object in previous frames that it appears.

Features may be defined by characteristics. For example, segments of a picture that share the same characteristics are categorized together as the same feature. A feature for different frames may not have the same exact characteristics but may be similar in some. For example, a hand may have similar edge contours. Different characteristics may be attributed to the features and are shown. The characteristics may include luma, color, smoothness, edge content, motion, size, position, or other characteristics. The smaller objects may be featured by thumbnails while larger objects may include other features, such as edge contours and motion contours.

As shown, the first level of hierarchy includes a human body feature and other objects' features 306. The human body may be further defined into a hands feature 308, a shoulders feature 310, and a head/face feature 312. The head/face feature 312 may be further defined into an eyes feature 314, a mouth feature 316, a nose feature 318 and an ears feature 320. The other objects' in the frame may include background or foreground features.

Each macroblock in a frame may be encoded. Motion prediction is performed to determine a reference block to use to encode the current macroblock. The motion prediction involves determining a subset of reference frames and then performing a motion search in the subset to determine a reference block that best fits the current macroblock.

A current macroblock may include one of the features that is included in the current frame. For example, a current macroblock may include a hand of a person. A macroblock may include many features but for discussion purposes, one feature is assumed. Feature tracker 204 in frame analyzer 202 receives the current frame and analyzes the current frame to determine features in it. In one example, objects may be found in a frame and an object may be segmented based on its features. The objects may include a human or other objects, such as inanimate objects. The features may include parts of the object (or the whole object), such as a human head, a hand, arm, or torso.

Feature tracker 204 may determine features that may be included in the frame. For example, if a left hand is included in a frame, then that feature is noted. The position of the features in the frame may also be noted, which will be used later when macroblocks of the frame are encoded. Features for each current macroblock may be determined. Thus a list of features for the frame is determined. A list of features is also maintained for each reference frame in memory.

A frame subset determiner 206 then uses a feature for each current macroblock to determine a subset of frames from reference memory 108. As described above, the reference frames stored in reference memory 108 each have a list of features, and may be classified based on a plurality of classifiers, which may correspond to different features.

Feature tracker 204 analyzes the frame to detect a list of objects, with characteristics. Frame subset determiner 206 may use the list of features to search frames in reference database 108 that include a similar list of features. For example, for each macroblock, a feature is determined with certain characteristics. Those characteristics are used to determine a subset of frames that include the same or substantially similar characteristics. For example, the characteristics are used as dimensions in a search of reference frames.

Reference frames and blocks with similar characteristics are determined. The subset of frames may be an ordered list of most likely reference frames and block locations for each feature.

A motion searcher 208 then performs a motion search in the subset of frames that were determined for each current macroblock. The motion search may be performed to determine a reference frame in the subset of frames that includes a reference block that can be used for motion prediction. Thus, the motion search may take place in frames where an object is in a similar position to where it is now. The desired effect is to search for parts of an object, for example, in frames where the object is in a similar position to where it is now. Of the thousands of frames to choose from, it is likely that a picture of this particular pose is found somewhere. The motion search may be limited to a small number of frames that include the feature and similar characteristics of the feature for the current macroblock. The motion search is thus reduced to a very small search window and a small number of reference frames. A block can then be determined and the determined block is then used to encode the current macroblock.

The motion search may be performed by analyzing blocks of data in the subset of reference frames. If the current macroblock is a 16 by 16 block, a 16 by 16 window is used to select a 16 by 16 block in a reference frame. For example, a block in the same position as the current macroblock is first selected. The difference between the current macroblock and the selected reference block is then calculated to yield a difference value. The 16 by 16 block may then be shifted to another 16 by 16 block (e.g., a window may be shifted 1 pixel to the right.) and the difference is measured again. If a smaller difference is found, then this block may be a better reference block because the difference between it and the current macroblock is less. This process may continue until a reference block is determined that is considered a best match for the current macroblock (i.e., has the least difference in values).

Motion compensation can also be used on smaller blocks within a macroblock, such as 8 by 8 blocks. Also, the decision to use a block may consider the cost of encoding the block mode and motion vector. Such techniques are still applicable.

Once the reference block is determined, a hybrid encoder 210 is then used to encode the frame. The position of the reference block, relative to the position of the current block, is called the motion vector. The motion vector or vectors are determined for the current macroblock. The motion vector and the reference frame are identified to the decoder. They may be encoded into the bitstream using a variable length code. In one embodiment, based on AVC H.264, the motion vector and reference frame are encoded in a context-adaptive way, using Context-adaptive variable-length coding (CAVLC) or Context-adaptive binary arithmetic coding (CABAC). To further reduce the number of bits required to signal the reference frame, the context of the reference frame subset is employed.

Also shown is the process to add reference frames to the reference frame memory 108. This process may be performed dynamically as reference frames are received. A feature analysis object segmenter 212 is used to determine features in the current frame. Feature analysis object segmenter 212 may receive the frame being encoded and analyze it for features found within. A reference frame feature list 214 is generated and then stored in reference frame memory 108 with the reference frame. The feature list associates all the features and their associated characteristics with the frame.

Not all reference frames may be saved. For example, image quality may vary from frame to frame due to image motion, image complexity, and network bit rate availability. Particular embodiments may favor high-quality reference frames. In one embodiment, only reference frames considered to be of high quality may be retained in memory 108 to conserve space and processing time. The quality may be measured by various parameters, such as the quantization parameter (QP).

Ultimately, memory 108 may be filled with reference frames that may have to be discarded. Different examples of discarding mechanisms may be used. For example, the oldest frame may be discarded. Also, frames of lower quality (e.g. as measured by the average quantization parameter (QP)) may be discarded sooner. A signal in the bit stream may indicate which stored frame may be discarded. Or a new frame may not be saved as a long-term reference frame. Further, frames that have not been used as a reference for some window of time (or for some window, e.g. five minutes can be discarded).

Once the macroblocks of the frame are encoded, they are sent to decoder 106 in a compressed bitstream. A way to signal decoder 106 as to which reference macroblock was used in the encoding process is needed. This allows decoder 106 to determine the reference macroblock and frame from reference frame memory 108-2. A delta of the motion vector may also be signaled.

Different information may be signaled, such as an identifier may be provided. For example, a position in an ordered list of frames may be provided. Also, any other identifier may be used that allows decoder 106 to identify the reference frame in reference memory 108-2. In one example, an identifier for the best frame and motion vector are sent to decoder 106, which then can retrieve the best frame and motion vector from reference memory 108 for each macroblock. Macroblocks in the frame may then be decoded and output. It is expected that the identifier includes fewer bits than what would have been needed to select a reference frame from the total number of stored reference frames. A motion vector may be coded as the delta from the predicted vector of the selected reference frame.

Figure 4:
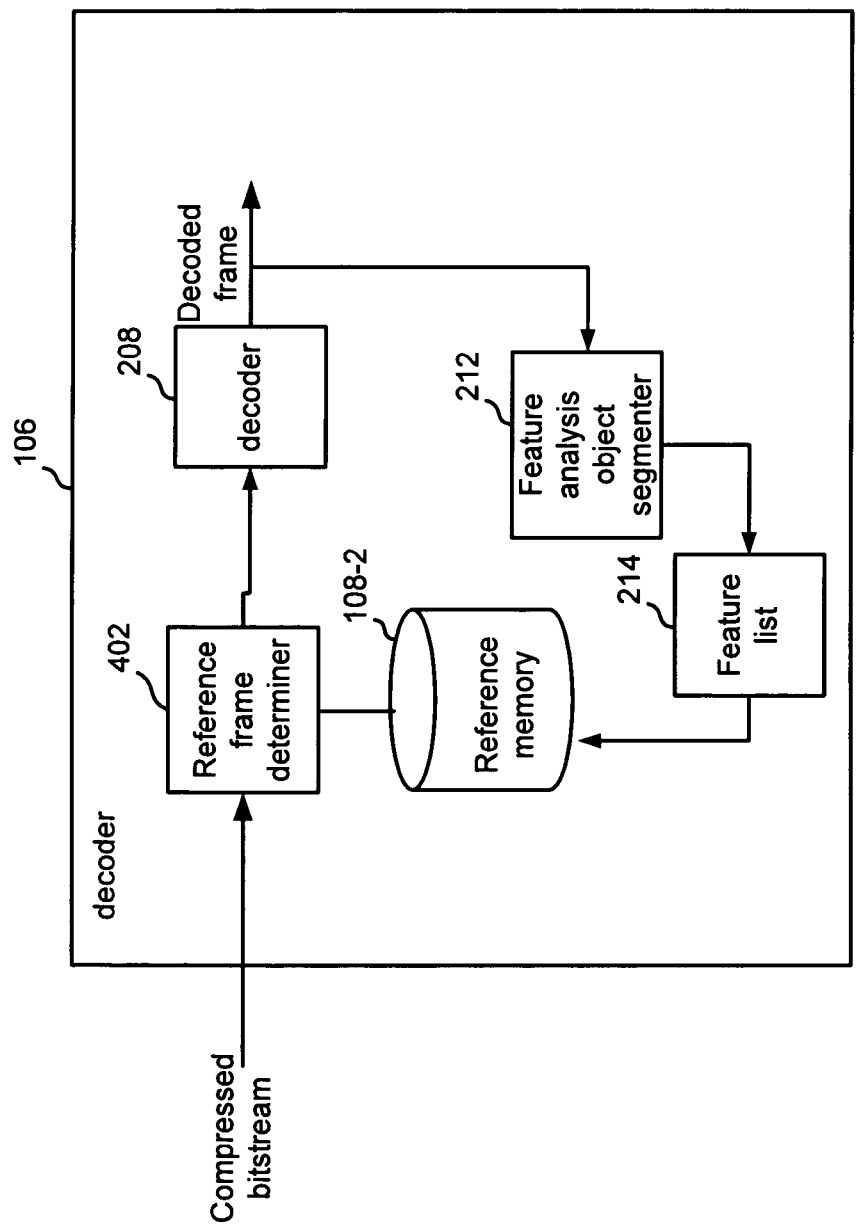
FIG. 4 depicts an example of a decoder according to one embodiment.

FIG. 4 depicts an example of a decoder 106 according to one embodiment. For discussion, it is assumed that the decoder already has a number of reference frames in memory 108-2. Decoder 208 produces the output of a decoded frame. The decoded frame also passes to feature analysis object segmenter 212. The frame is analyzed for objects and features, using the same algorithms used by the encoder frame analyzer 202. The result is a list of features, which includes the location of objects in the frame.

The feature list 214 and the decoded frame itself are both moved to reference memory. If the reference memory is full, then the oldest reference frame is deleted, along with its feature list.

The system is now ready to decode a new frame. The decoder receives a compressed bitstream. In one embodiment reference frame determiner 402 may decode the reference frame index from the compressed bitstream. In that embodiment there is no advantage to creating the feature list 214 in the decoder. In another embodiment, reference frame determiner 402 produces a subset of reference frames, just as the encoder did. Since it cannot see the features of the about-to-be decoded frame, it predicts those features based on past reference frames.

The decoder will analyze the frame after it is decoded to determine which features are present in the frame. The features are used to predict features in the next frame. Those features determine a classifier, which is used to determine a subset of the reference frames. For example, if the previous frame contained an object such as a human head, and it was oriented in a certain position, and it was moving in a direction, then reference frame determiner 402 would predict that it would continue to move in that way. Reference frame determiner 402 searches for reference frames which matched that particular motion to choose a set of likely reference frames.

The encoder, by mirroring the decoder's process, also knows which reference frames the decoder will chose for the subset. For the current frame, the encoder needs to signal the decoder which reference frame to use for some particular macroblock. Since that frame is already part of the subset, the encoder only needs to signal that the frame is one of, for example 4. Without the subset, the encoder would have to identify the reference frame as one of, for example 4000. In this way the bitstream can carry less information, since the data can be predicted by the decoder.

In the final step of the decode process, reference frame determiner 402 supplies decoder 208 with the information it needs for each macroblock, which is the reference frame index. The decoder decodes the full picture, and the process starts again.

Particular embodiments provide many advantages. A large reference memory may be used to determine a reference frame. The bitrate used to send the compressed bitstream is reduced. Also, search time to find the reference frame is reduced by only searching a subset of frames in the reference memory.

A video encoding and decoding method are described which can achieve superior quality or lower bitrates. The advantage of large numbers of reference frames can be maintained by reducing the search time. For each coding unit, a subset of reference frames are chosen, based on certain features. This feature-based selection allows the encoder to find suitable motion vectors and frames quickly. The decoder uses a similar feature-based classification, so the subset information does not have to be transmitted in the compressed bitstream.

Although the description has been described with respect to particular embodiments thereof, these particular embodiments are merely illustrative, and not restrictive. Although video is discussed, it will be understood that any data that is compressed may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method comprising:

receiving a current frame to encode;

analyzing the current frame to determine a primary feature for the frame and a secondary feature and a tertiary feature for a current macroblock in the frame, wherein the secondary feature is part of the primary feature and is based on at least a portion of an object found in the current frame, wherein the tertiary feature is part of the secondary feature and is based on at least a portion of an object found the in the current frame, wherein the primary feature is a first level in a hierarchy of features of the object, the secondary feature is a second level in the hierarchy of features of the object, and the tertiary feature is a third level in the hierarchy of features of the object;

determining, based on the tertiary feature, a subset of reference frames from a storage of reference frames in memory, the reference frames classified based on a plurality of features, wherein a total number of the subset of reference frames is less than a total number of reference frames;

performing a first motion search using a first block of data in the subset of reference frames, wherein a first difference value between the current macroblock and the first block of data is calculated;

performing a second motion search using a second block of data in the subset of reference frames, wherein a second difference value between the current macroblock and the second block of data is calculated;

classifying the first block of data as a reference block if the first difference value is less than the second difference value;

classifying the second block of data as the reference block if the second difference value is less than the first difference value; and encoding the current macro block using the reference block.

2. The method of claim 1, wherein the object comprises a feature of a human body.

3. The method of claim 1, further comprising:
determining an identifier for the reference frame; and
sending the identifier to a decoder to allow the decoder to select the reference frame from a second memory of reference frames.

4. The method of claim 1, further comprising classifying reference frames in the reference memory based on characteristics for each reference frame, wherein determining the subset comprises using the one or more characteristics to search the memory for reference frames with similar characteristics.

5. The method of claim 1, wherein the difference value between the current macroblock and the reference block is less than a difference value between the current macroblock and any other block of data in the subset of reference frames.

6. A method comprising:
receiving an encoded bitstream, wherein the encoded bitstream includes a current frame;
determining a subset of reference frames from a storage of reference frames based on a tertiary feature determined in a previously decoded frame, wherein the tertiary feature is a subset of a secondary feature and the secondary feature is a subset of a primary feature, wherein a total number of the subset of reference frames is less than a total number of reference frames, and wherein the primary feature is a first level in a hierarchy of features of the object, the secondary feature is a second level in the hierarchy of features of the object, and the tertiary feature is a third level in the hierarchy of features of the object;
receiving an identifier for a particular reference frame from the subset of reference frames; and
decoding a current macroblock from the current frame using the particular reference frame identified, wherein a difference value indicates a difference between the current macroblock and the particular reference frame identified, and wherein the difference value between the current macroblock and the particular reference frame is less than a difference value between the current macroblock and any other block of data in the subset of reference frames.

7. The method of claim 6, wherein determining a subset of reference frames from the storage of reference frames comprises:
predicting a future feature in a frame to be decoded based on the future feature being present in the previously decoded frame;
matching the predicted future feature of the frame to be decoded with one or more tertiary features in reference frames in the storage of reference frames.

8. The method of claim 6, wherein the identifier is used to determine the particular reference frame in the subset based on a position in the subset of reference frames determined and not the position in all of the storage of reference frames.

9. The method of claim 8, wherein an encoder determines the identifier by performing the determination of the subset that the decoder performs and determining the position in the subset of references frames for the particular reference frame.

10. An apparatus comprising:
one or more processors; and
logic encoded in one or more tangible media for execution by the one or more processors and when executed operable to:
receive a current frame to encode;
analyze the current frame to determine a primary feature for the frame and a secondary feature and a tertiary feature for a current macroblock in the frame, wherein the secondary feature is part of the primary feature and is based on at least a portion of an object found in the current frame, wherein the tertiary feature is part of the secondary feature and is based on at least a portion of an object found the in the current frame, wherein the primary feature is a first level in a hierarchy of features of the object, the secondary feature is a second level in the hierarchy of features of the object, and the tertiary feature is a third level in the hierarchy of features of the object; and
determine, based on the tertiary feature, a subset of reference frames from a storage of reference frames in memory, the reference frames classified based on a plurality of features, wherein a total number of the subset of reference frames is less than a total number of reference frames.

11. The apparatus of claim 10, wherein the object comprises a feature of a human body.

12. The apparatus of claim 10, wherein the logic when executed is further operable to:
determine an identifier for the reference frame; and
send the identifier to a decoder to allow the decoder to select the reference frame from a second memory of reference frames.

13. The apparatus of claim 10, wherein the logic when executed is further operable to classify reference frames in the reference memory based on characteristics for each reference frame, wherein logic operable to determine the subset comprises logic operable to use the one or more characteristics to search the memory for reference frames with similar characteristics.

14. The apparatus of claim 10, wherein the logic operable to perform the motion search comprises logic operable to determine a reference block from one of the subset of reference frames that is considered to be an optimal reference for the current macroblock.

15. An apparatus comprising:
one or more processors; and
logic encoded in one or more tangible media for execution by the one or more processors and when executed operable to:
receive an encoded bitstream, wherein the encoded bitstream includes a current frame;
determine a subset of reference frames from a storage of reference frames based on a tertiary feature determined in a previously decoded frame, wherein the tertiary feature is a subset of a secondary feature and the secondary feature is a subset of a primary feature, wherein a total number of the subset of reference frames is less than a total number of reference frames, and wherein the primary feature is a first level in a hierarchy of features of the object, the secondary feature is a second level in the hierarchy of features of the object, and the tertiary feature is a third level in the hierarchy of features of the object;
receive an identifier for a particular reference frame from the subset of reference frames; and
decode a current macroblock from the current frame using the particular reference frame identified, wherein a difference value indicates a difference between the current macroblock and the particular reference frame identified, and wherein the difference value between the current macroblock and the particular reference frame is less than a difference value between the current macroblock and any other block of data in the subset of reference frames.

16. The apparatus of claim 15, wherein the logic operable to determine a subset of reference frames from the storage of reference frames comprises logic operable to:
   predict a future feature in the frame to be decoded based on the future feature being present in the previously decoded frame; and
   match the predicted future feature of the frame to be decoded with one or more secondary features in reference frames in the storage of reference frames.

17. The apparatus of claim 15, wherein the identifier is used to determine the particular reference frame in the subset based on a position in the subset of reference frames determined and not the position in all of the storage of reference frames.

18. The apparatus of claim 17, wherein an encoder determines the identifier by performing the determination of the subset that the decoder performs and determining the position in the subset of references frames for the particular reference frame.

19. The apparatus in claim 15, further operable to:

perform a first motion search using a first block of data in the subset of reference frames, wherein a first difference value between the current macroblock and the first block of data is calculated; and perform a second motion search using a second block of data in the subset of reference frames, wherein a second difference value between the current macroblock and the second block of data is calculated.

20. The apparatus in claim 19, further operable to;

classify the first block of data as a reference block if the first difference value is less than the second difference value;

classify the second block of data as the reference block if the second difference value is less than the first difference value; and encode the current macroblock using the reference block.

* * * * *